(12) United States Patent
Yuan et al.

(10) Patent No.: US 12,268,236 B2
(45) Date of Patent: Apr. 8, 2025

(54) BATTERY ASSEMBLY AND ELECTRONIC VAPORIZATION DEVICE

(71) Applicant: SHENZHEN SMOORE TECHNOLOGY LIMITED, Guangdong (CN)

(72) Inventors: Huakai Yuan, Shenzhen (CN); Minfeng Xiao, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 392 days.

(21) Appl. No.: 17/851,550

(22) Filed: Jun. 28, 2022

(65) Prior Publication Data

US 2023/0014694 A1    Jan. 19, 2023

(30) Foreign Application Priority Data

Jul. 13, 2021   (CN) .......................... 202121606789.7

(51) Int. Cl.
*A24F 40/40*    (2020.01)
*A24F 40/90*    (2020.01)
*H01M 50/202*   (2021.01)
*H01M 50/247*   (2021.01)
*H01M 50/574*   (2021.01)

(52) U.S. Cl.
CPC .............. *A24F 40/40* (2020.01); *A24F 40/90* (2020.01); *H01M 50/202* (2021.01); *H01M 50/247* (2021.01); *H01M 50/574* (2021.01); *H01M 2200/00* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2015/0047660 A1* | 2/2015 | Liu | H02J 7/0042 320/107 |
| 2015/0047663 A1* | 2/2015 | Liu | H01M 10/46 429/163 |
| 2015/0107609 A1* | 4/2015 | Liu | A24F 40/60 131/329 |
| 2016/0360793 A1* | 12/2016 | Liu | A24F 40/90 |
| 2018/0279682 A1* | 10/2018 | Guo | A24F 40/42 |
| 2020/0000146 A1* | 1/2020 | Anderson | A24F 40/90 |

FOREIGN PATENT DOCUMENTS

CN           203398240 U  *  1/2014

* cited by examiner

*Primary Examiner* — Cynthia Szewczyk
(74) *Attorney, Agent, or Firm* — Leydig, Voit & Mayer, Ltd.

(57) ABSTRACT

A battery assembly, connected to a vaporization component and supplying power to the vaporization component, includes: a shell; a battery core accommodated in the shell; a first interface provided on the shell, the first interface being provided for insertion of an external device such that the external device charges the battery core; and an action assembly accommodated in the shell. When the external device is inserted into the first interface, the action assembly shuts off an electrical connection between the vaporization component and the battery assembly.

10 Claims, 4 Drawing Sheets

BATTERY ASSEMBLY AND ELECTRONIC VAPORIZATION DEVICE

CROSS-REFERENCE TO PRIOR APPLICATION

Priority is claimed to Chinese Patent Application No. CN 202121606789.7, filed on Jul. 13, 2021, the entire disclosure of which is hereby incorporated by reference herein.

FIELD

This application relates to the field of vaporization, and in particular, to a battery assembly and an electronic vaporization device.

BACKGROUND

An existing electronic vaporization device includes a vaporizer and a battery assembly. The vaporizer is configured to heat and vaporize a to-be-vaporized aerosol substrate, and the battery assembly supplies power to the vaporizer.

However, due to production defects and the uncertainty of application environments of the existing electronic vaporization device, the electronic vaporization device often encounters self-starting. The self-starting brings a huge safety risk to a user, such as dry burning and causing damage to the vaporizer. Existing solutions are mainly performed from production quality improvement, which may reduce the risk of self-starting as much as possible. However, the self-starting problem cannot be fundamentally resolved, and false starting may occur in some actual application scenarios. For example, when the electronic vaporization device is falsely started during charging, there is a potential safety risk if the user is not nearby.

SUMMARY

In an embodiment, the present invention provides a battery assembly, connected to a vaporization component and supplying power to the vaporization component, the battery assembly comprising: a shell; a battery core accommodated in the shell; a first interface provided on the shell, the first interface being configured for insertion of an external device such that the external device charges the battery core; and an action assembly accommodated in the shell, wherein, when the external device is inserted into the first interface, the action assembly is configured to shut off an electrical connection between the vaporization component and the battery assembly.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a battery assembly and an electronic vaporization device, to resolve the problem that the electronic vaporization device is automatically started during charging in the related art.

In an embodiment, the present invention provides a battery assembly, connected to a vaporization component and supplying power to the vaporization component, the battery assembly including: a shell, a battery core, a first interface, and an action assembly, where the battery core, the first interface, and the action assembly are accommodated in the shell; the first interface is configured to be electrically connected to an external device, to charge the battery core; and the action assembly is configured to shut off an electrical connection between the vaporization component and the battery assembly when the external device is connected to the first interface.

The action assembly includes a mechanical movable member; and when the external device is inserted into the first interface, the external device pushes the mechanical movable member to move from a first position to a second position, and the mechanical movable member pushes the vaporization component to move simultaneously, to shut off the electrical connection between the vaporization component and the battery assembly.

When the mechanical movable member is at the first position, an end surface of an end of the mechanical movable member close to the vaporization component is lower than or equal to an end surface of an end of an electrode of the battery assembly close to the vaporization component, so that the electrode of the battery assembly is in an electrical connection with an electrode of the vaporization component; and when the mechanical movable member is at the second position, the end surface of the end of the mechanical movable member close to the vaporization component is higher than the end surface of the end of the electrode of the battery assembly close to the vaporization component, so that the electrical connection between the electrode of the battery assembly and the electrode of the vaporization component is shut off.

The battery assembly further includes a holder arranged in the shell, where the mechanical movable member is arranged on the holder and is slidably connected to the holder.

The mechanical movable member includes a first push rod, a second push rod, and a connection rod; the first push rod and the second push rod are spaced; the first push rod and the second push rod are both slidably connected to the holder; end portions of the first push rod and the second push rod that are away from the first interface abut against the vaporization component; and end portions of the first push rod and the second push rod that are close to the first interface are connected through the connection rod.

A connection base is arranged on an end portion of the holder close to the vaporization component, a magnetic element is arranged on the connection base, and the magnetic element causes the battery assembly and the vaporization component to be connected through a magnetic attraction force; and when the external device is pulled out from the first interface, the magnetic attraction force is greater than a friction force between the holder and the mechanical movable member, so that the vaporization component pushes the mechanical movable member to move from the second position to the first position, and the vaporization component is in an electrical connection with the battery assembly.

After the external device is inserted into the first interface, the magnetic attraction force is less than a sum of a friction force between the external device and the first interface and the friction force between the holder and the mechanical movable member, so that the external device is automatically maintained in the first interface.

A connection base is arranged on an end portion of the holder close to the vaporization component, a magnetic element is arranged on the connection base, and the magnetic element causes the battery assembly and the vaporization component to be connected through a magnetic attraction force; and when the external device is pulled out from the first interface, a friction force between the holder and the mechanical movable member is greater than the magnetic attraction force, so that the mechanical movable member is maintained at the second position.

A connection structure configured to be clamped to the vaporization component is arranged on an end of the battery assembly close to the vaporization component; the action assembly includes a mechanical movable member and an elastic member; the elastic member is arranged on an end portion of the battery assembly close to the vaporization component, and when the vaporization component is clamped to the battery assembly, the elastic member is compressed; and when the external device is inserted into the first interface, the external device pushes the mechanical movable member to disconnect the battery assembly from the vaporization component, and the elastic member changes from a compressed state to a normal state, to push the battery assembly to shut off the electrical connection with the vaporization component.

To resolve the foregoing technical problem, this application further provides an electronic vaporization device, including: a vaporization component, configured to heat and vaporize an aerosol generation substrate; and a battery assembly, where the battery assembly is the battery assembly according to any one of the foregoing.

Beneficial effects of this application are as follows: Different from the related art, this application provides a battery assembly and an electronic vaporization device. The battery assembly includes: a shell; a battery core, accommodated in the shell; a first interface, provided in the shell and configured to be electrically connected to an external device, to charge the battery core; and an action assembly, accommodated in the shell, where the action assembly is configured to shut off an electrical connection between the vaporization component and the battery assembly when the external device is connected to the first interface. Through the foregoing arrangement, the problem that the electronic vaporization device is automatically started during charging can be resolved, and occurrence of unsafe conditions can be prevented.

The technical solutions in embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

The terms "first", "second", and "third" in this application are merely intended for a purpose of description, and shall not be understood as indicating or implying relative significance or implicitly indicating the number of indicated technical features. Therefore, features defining "first", "second", and "third" can explicitly or implicitly include at least one of the features. In the description of this application, "a plurality of" means at least two, such as two and three unless it is specifically defined otherwise. All directional indications (for example, upper, lower, left, right, front, and rear) in the embodiments of this application are merely used for explaining relative position relationships, movement situations, or the like between the various components in a specific posture (as shown in the accompanying drawings). If the specific posture changes, the directional indications change accordingly. In addition, the terms "include", "have", and any variant thereof are intended to cover a non-exclusive inclusion. For example, a process, method, system, product, or device that includes a series of steps or units is not limited to the listed steps or units, but further optionally includes a step or unit that is not listed, or further optionally includes another step or unit that is intrinsic to the process, method, product, or device.

"Embodiment" mentioned in this specification means that particular features, structures, or characteristics described with reference to the embodiment may be included in at least one embodiment of this application. The term appearing at different positions of this specification may not refer to the same embodiment or an independent or alternative embodiment that is mutually exclusive with another embodiment. A person skilled in the art explicitly or implicitly understands that the embodiments described in this specification may be combined with other embodiments.

Figure 1:
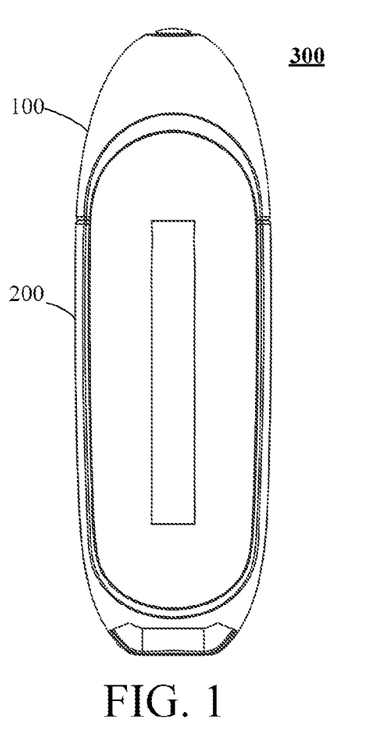
FIG. 1 is a schematic structural diagram of an embodiment of an electronic vaporization device according to this application.
Figure 2:
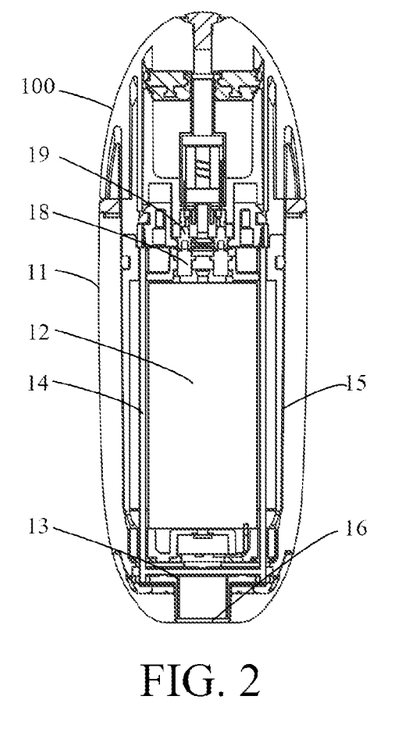
FIG. 2 is a cross-sectional view of FIG. 1.
Figure 3:
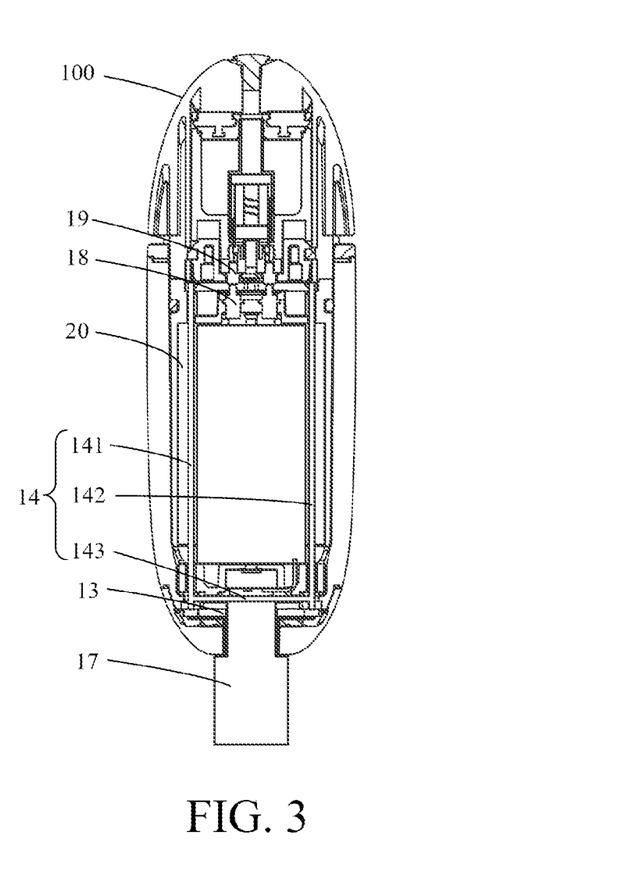
FIG. 3 is a schematic diagram when the electronic vaporization device shown in FIG. 2 is connected to an external device.
Figure 4:
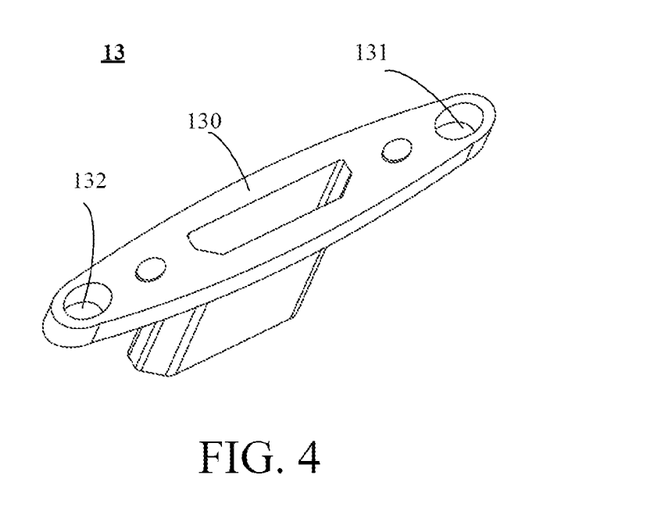
FIG. 4 is a schematic structural diagram of a first interface according to this application.
Figure 5:
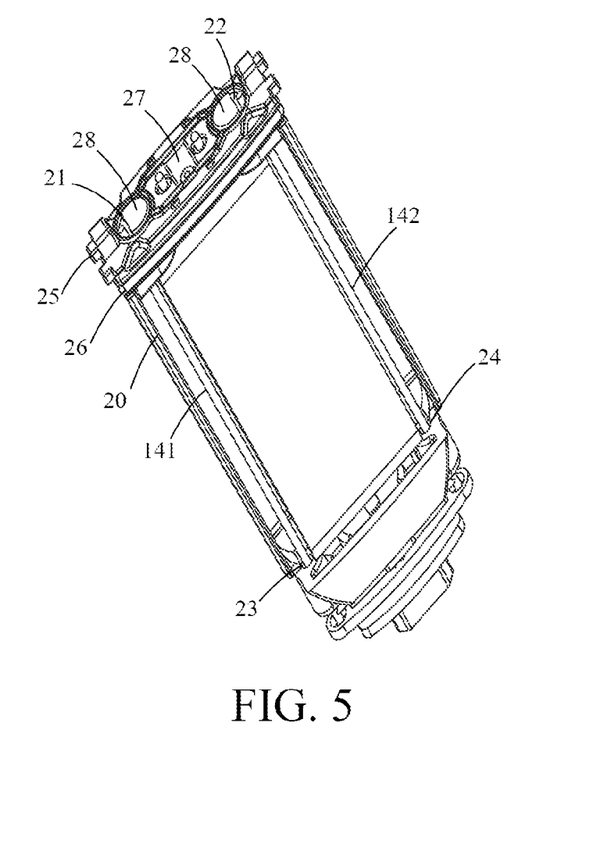
FIG. 5 is a schematic structural diagram of a battery assembly with a shell being removed according to this application.

Referring to FIG. 1 to FIG. 5, FIG. 1 is a schematic structural diagram of an embodiment of an electronic vaporization device according to this application; FIG. 2 is a cross-sectional view of FIG. 1; FIG. 3 is a schematic diagram when the electronic vaporization device shown in FIG. 2 is connected to an external device; FIG. 4 is a schematic structural diagram of a first interface according to this application; and FIG. 5 is a schematic structural diagram of a battery assembly with a shell being removed according to this application.

Referring to FIG. 1, the electronic vaporization device 300 may be configured to vaporize an aerosol generation substrate and medicinal liquid. The electronic vaporization device 300 includes a vaporization component 100 and a battery assembly 200 that are connected to each other.

The battery assembly 200 supplies power to the vaporization component 100.

In an implementation, the vaporization component 100 is configured to store an aerosol generation substrate and vaporize the aerosol generation substrate to form aerosols that can be inhaled by a user. Specifically, the vaporization component 100 may be applied to different fields such as medical care, agricultural industry, and vaporizer. The battery assembly 200 includes a battery core 12 (referring to FIG. 2), an airflow sensor, and a control circuit board. The battery core 12 is configured to supply power to the vaporization component 100. The airflow sensor is configured to detect an airflow change in the electronic vaporization device 300. The control circuit board controls the battery core to supply power to the vaporization component 100 according to the airflow change detected by the airflow sensor, so that the vaporization component 100 heats and vaporizes the aerosol generation substrate to generate aerosols.

Referring to FIG. 2, the battery assembly 200 provided in this application includes a shell 11, a battery core 12, a first interface 13, and an action assembly 14. The shell 11 includes an accommodating cavity 15, and the battery core 12 and the action assembly 14 are arranged in the accommodating cavity 15. An end portion of the shell 11 includes a first through hole 16, the first interface 13 is provided in the accommodating cavity 15 and is exposed through the first through hole 16, and the first interface 13 is provided for insertion of an external device 17 (referring to FIG. 3), so that the external device 17 charges the battery core 12. The external device 17 may be a plug of a charging cable. Specifically, the shell 11 may be made of plastics or may be made of a synthetic resin, provided that the shell is not electrically conductive, heat resistant, and has a certain strength to protect internal elements from being damaged by an external force. A size and a shape of the shell 11 are not limited and can be designed as required.

A shape of the battery core 12 is a cylinder or a rectangle, and a specific size and a specific shape of the battery core are not limited, which are designed in an engagement manner according to a power and a shape of the electronic vaporization device 300 and are not limited herein. Referring to FIG. 3, in this implementation, the battery core 12 is a rectangular rechargeable lithium battery, an end of the battery core 12 close to the first interface 13 is electrically connected to the first interface 13, and the external device 17 charges the battery core 12 through the first interface 13. Two first electrodes 18 are arranged on an end of the battery core 12 away from the first interface 13, and the battery core 12 supplies power to the vaporization component 100 through the first electrode 18.

The first interface 13 may be a universal serial bus (USB) female connector or a USB male connector and is configured to be electrically connected to the external device 17. For example, when the first interface 13 is a USB female connector, the external device 17 is connected to the first interface 13 through a USB male connector or is converted into a USB male connector through a converter to be connected to the first interface. The first interface 13 includes a fixing base 130 (referring to FIG. 4), and the fixing base 130 is accommodated in the shell 11 and is fixedly connected to the shell 11. To protect the battery core 12, a protection circuit is further arranged between the first interface 13 and the battery core 12, to rectify a current and a voltage outputted by the external device 17 into a voltage and a current that allow the battery core 12 to work normally.

The action assembly 14 is accommodated in the accommodating cavity 15 of the shell 11, and when the external device 17 is inserted into the first interface 13, the action assembly 14 shuts off an electrical connection between the vaporization component 100 and the battery assembly 200.

In an implementation, the action assembly 14 includes a mechanical movable member; and when the external device 17 is inserted into the first interface 13, the external device 17 pushes the mechanical movable member to move from a first position to a second position, and the mechanical movable member pushes the vaporization component 100 to move simultaneously, to shut off the electrical connection between the vaporization component 100 and the battery assembly 200. Specifically, when the mechanical movable member is at the first position, an end surface of an end of the mechanical movable member close to the vaporization component 100 is lower than or equal to an end surface of an end of the first electrode 18 of the battery assembly 200 close to the vaporization component 100, so that the first electrode 18 of the battery assembly 200 is in an electrical connection with a second electrode 19 of the vaporization component 100; and when the mechanical movable member is at the second position, the end surface of the end of the mechanical movable member close to the vaporization component 100 is higher than the end surface of the end of the first electrode 18 of the battery assembly 200 close to the vaporization component 100, so that the first electrode 18 of the battery assembly 200 and the second electrode 19 of the vaporization component 100 are disconnected.

Further, the battery assembly 200 further includes a holder 20, and the holder 20 is arranged in the shell 11.

The mechanical movable member is arranged on the holder 20 and is slidably connected to the holder 20. Specifically, the mechanical movable member includes a first push rod 141, a second push rod 142, and a connection rod 143; the first push rod 141 and the second push rod 142 are spaced; the first push rod 141 and the second push rod 142 are both slidably connected to the holder 20; end portions of the first push rod 141 and the second push rod 142 that are away from the first interface 13 abut against the vaporization component 100; and end portions of the first push rod 141 and the second push rod 142 that are close to the first interface 13 are connected through the connection rod 143. When the external device 17 is inserted into the first interface 13, the external device 17 pushes the connection rod 143 to cause the mechanical movable member to move from the first position to the second position. Referring to FIG. 3 and FIG. 5, in a specific implementation, an end of the holder 20 close to the vaporization component 100 includes a second through hole 21 and a third through hole 22, an end of the holder 20 close to the first interface 13 includes a fourth through hole 23 and a fifth through hole 24, the first push rod 141 passes through the second through hole 21 and the fourth through hole 23, the second push rod 142 passes through the third through hole 22 and the fifth through hole 24, and the connection rod 143 is arranged between the holder 20 and the first interface 13. A sixth through hole 131 and a seventh through hole 132 are further provided on the fixing base 130 of the first interface 13, the first push rod 141 further passes through the sixth through hole 131, and the second push rod 142 further passes through the seventh through hole 132. It may be understood that, the sixth through hole 131 and the seventh through hole 132 may alternatively be blind holes, provided that the mechanical movable member is fixed. Specifically, a movement path of the connection rod 143 between the holder 20 and the first interface 13 may cause an end of the first push rod 141 close to the vaporization component 100 and an end of the second push rod 142 close to the vaporization component 100 to be lower than the first electrode 18 (namely, the first push rod 141 and the second push rod 142 are at the first position) or higher than the first electrode 18 (namely, the first push rod 141 and the second push rod 142 are at the second position). Therefore, when the mechanical movable member is at the first position, the first electrode 18 is in an electrical connection with the second electrode 19; and when the mechanical movable member is at the second position, the electrical connection between the first electrode 18 and the second electrode 19 is shut off. It may be understood that, a slide groove may alternatively be provided on two ends or a side wall of the holder 20, and the mechanical movable member is arranged in the slide groove to implement a slide connection.

Further, a clamping member 25 is further arranged on the holder 20 and is configured to be clamped and fixed to the shell 11. There may be a plurality of clamping members 25, the plurality of clamping members are spaced surrounding an edge of the holder 20 or arranged relative to two ends of the holder 20, which is not specifically limited, provided that the holder 20 is fixed to the shell 11. To prevent leaked liquid of a liquid aerosol generation substrate in the vaporization component 100 from permeating into the battery assembly 200 and affecting normal working of the battery assembly 200, a seal member 26 is further arranged on the end of the holder 20 close to the vaporization component 100, and a material of the seal member 26 may be silica gel or rubber.

A connection base 27 is arranged on an end portion of the holder 20 close to the vaporization component 100, a magnetic element 28 is arranged on the connection base 27, and the magnetic element 28 causes the battery assembly 200 and the vaporization component 100 to be connected through a magnetic attraction force. In an implementation, there are two magnetic elements 28, and the two magnetic elements 28 may be respectively accommodated in the second through hole 21 and the third through hole 22.

In an implementation, after the external device 17 is inserted into the first interface 13, the magnetic attraction force between the battery assembly 200 and the vaporization component 100 is less than a sum of a friction force between the external device 17 and the first interface 13 and a friction force between the holder 20 and the mechanical movable member, so that the external device 17 is automatically maintained in the first interface 13. That is, the external device 17 is inserted into the first interface 13 under the action of an external force, and the external device 17 pushes the mechanical movable member to move from the first position to the second position; and after the external force is removed, the magnetic attraction force between the battery assembly 200 and the vaporization component 100 is not enough to push the external device 17 out of the first interface 13. In another implementation, when the external device 17 is pulled out from the first interface 13, the magnetic attraction force between the battery assembly 200 and the vaporization component 100 is greater than a friction force between the holder 20 and the mechanical movable member, so that the vaporization component 100 pushes the mechanical movable member to move from the second position to the first position, and the vaporization component 100 is in an electrical connection with the battery assembly 200. That is, after the external device 17 is pulled out from the first interface 13, the magnetic attraction force between the battery assembly 200 and the vaporization component 100 can cause the mechanical movable member to move from the second position to the first position. In another implementation, when the external device 17 is pulled out from the first interface 13, the friction force between the holder 20 and the mechanical movable member is greater than the magnetic attraction force between the battery assembly 200 and the vaporization component 100, so that the mechanical movable member is maintained at the second position. That is, after the external device 17 is pulled out from the first interface 13, the magnetic attraction force between the battery assembly 200 and the vaporization component 100 is not enough to cause the mechanical movable member to move from the second position to the first position, and the user needs to manually implement the electrical connection between the battery assembly 200 and the vaporization component 100. Such an implementation may be applicable to a press manner or a button manner.

In other implementations, a connection structure configured to be clamped to the vaporization component 100 is arranged on an end of the battery assembly 200 close to the vaporization component 100. The action assembly 14 includes a mechanical movable member and an elastic member. The elastic member is arranged on an end portion of the battery assembly 200 close to the vaporization component 100, and after the vaporization component 100 is clamped to the battery assembly 200, the elastic member is compressed.

When the external device 17 is inserted into the first interface 13, the external device 17 pushes the mechanical movable member to move from the first position to the second position, to disconnect the battery assembly 200 from the vaporization component 100, and the elastic member changes from a compressed state to a normal state, to push the battery assembly 200 to shut off the electrical connection with the vaporization component 100. It may be understood that, the elastic member may alternatively be arranged on an end portion of the vaporization component 100 close to the battery assembly 200, and an effect that is the same as the foregoing can be achieved.

This application provides a battery assembly and an electronic vaporization device. The battery assembly includes a shell, a battery core, a first interface, and an action assembly, where the battery core, the first interface, and the action assembly are accommodated in the shell, and the first interface is configured to be electrically connected to an external device, to charge the battery core; and the action assembly is configured to shut off an electrical connection between the vaporization component and the battery assembly when the external device is connected to the first interface. Through the foregoing arrangement, the problem that the electronic vaporization device is automatically started during charging can be resolved, and occurrence of unsafe conditions can be prevented.

It may be understood that, the inventive idea of the action assembly in this application may also be applied to other electronic devices, provided that risks brought by self-starting that need to be prevented by the electronic device can be prevented by adopting the arrangement manner of the action assembly according to this application.

The foregoing descriptions are merely implementations of this application, and the patent scope of this application is not limited thereto. All equivalent structure or process changes made according to the content of this specification and accompanying drawings in this application or by directly or indirectly applying this application in other related technical fields shall fall within the protection scope of this application.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A battery assembly, connected to a vaporization component and supplying power to the vaporization component, the battery assembly comprising:
   a shell;
   a battery core accommodated in the shell;
   a first interface provided on the shell, the first interface being configured for insertion of an external device such that the external device charges the battery core; and
   an action assembly accommodated in the shell wherein the action assembly comprises a mechanical movable member,
   wherein, when the external device is inserted into the first interface, the action assembly is configured to shut off an electrical connection between the vaporization component and the battery assembly.

2. The battery assembly of claim 1,
   wherein, when the external device is inserted into the first interface, the external device is configured to push the mechanical movable member to move from a first position to a second position, and the mechanical movable member is configured to push the vaporization component to move simultaneously to shut off the electrical connection between the vaporization component and the battery assembly.

3. The battery assembly of claim 2, further comprising:
   a holder arranged in the shell,
   wherein the mechanical movable member is arranged on the holder and is slidably connected to the holder.

4. The battery assembly of claim 3, wherein a connection base is arranged on an end portion of the holder close to the vaporization component, a magnetic element is arranged on the connection base, and the magnetic element is configured to cause the battery assembly and the vaporization component to be connected through a magnetic attraction force, and
   wherein, when the external device is pulled out from the first interface, the magnetic attraction force is greater than a friction force between the holder and the mechanical movable member such that the vaporization component is configured to push the mechanical movable member to move from the second position to the first position, and the vaporization component is in an electrical connection with the battery assembly.

5. The battery assembly of claim 4, wherein, after the external device is inserted into the first interface, the magnetic attraction force is less than a sum of a friction force between the external device and the first interface and the friction force between the holder and the mechanical movable member such that the external device is automatically maintained in the first interface.

6. The battery assembly of claim 3, wherein a connection base is arranged on an end portion of the holder close to the vaporization component, a magnetic element is arranged on the connection base, and the magnetic element is configured to cause the battery assembly and the vaporization component to be connected through a magnetic attraction force, and
   wherein, when the external device is pulled out from the first interface, a friction force between the holder and the mechanical movable member is greater than the magnetic attraction force such that the mechanical movable member is maintained at the second position.

7. The battery assembly of claim 1, wherein a connection structure configured to be clamped to the vaporization component is arranged on an end of the battery assembly close to the vaporization component,
   wherein the action assembly comprises an elastic member, the elastic member being arranged on an end portion of the battery assembly close to the vaporization component, such that when the vaporization component is clamped to the battery assembly, the elastic member is compressed, and
   wherein, when the external device is inserted into the first interface, the external device is configured to push the mechanical movable member to disconnect the battery assembly from the vaporization component, and the elastic member is configured to change from a compressed state to a normal state so as to push the battery assembly to shut off the electrical connection with the vaporization component.

8. An electronic vaporization device, comprising:
   a vaporization component configured to store and vaporize an aerosol generation substrate; and
   the battery assembly of claim 1 configured to supply power to the vaporization component.

9. A battery assembly, connected to a vaporization component and supplying power to the vaporization component, the battery assembly comprising:
   a shell;
   a battery core accommodated in the shell;
   a first interface provided on the shell, the first interface being configured for insertion of an external device such that the external device charges the battery core; and
   an action assembly accommodated in the shell,
   wherein, when the external device is inserted into the first interface, the action assembly is configured to shut off an electrical connection between the vaporization component and the battery assembly,
   wherein the action assembly comprises a mechanical movable member,
   wherein, when the external device is inserted into the first interface, the external device is configured to push the mechanical movable member to move from a first position to a second position, and the mechanical movable member is configured to push the vaporization component to move simultaneously to shut off the electrical connection between the vaporization component and the battery assembly,
   wherein, when the mechanical movable member is at the first position, an end surface of an end of the mechanical movable member close to the vaporization component is lower than or equal to an end surface of an end of an electrode of the battery assembly close to the vaporization component such that the electrode of the battery assembly is in an electrical connection with an electrode of the vaporization component, and
   wherein, when the mechanical movable member is at the second position, the end surface of the end of the mechanical movable member close to the vaporization component is higher than the end surface of the end of the electrode of the battery assembly close to the vaporization component such that the electrical connection between the electrode of the battery assembly and the electrode of the vaporization component is shut off.

10. A battery assembly, connected to a vaporization component and supplying power to the vaporization component, the battery assembly comprising:
a shell;
a holder arranged in the shell;
a battery core accommodated in the shell;
a first interface provided on the shell, the first interface being configured for insertion of an external device such that the external device charges the battery core; and
an action assembly accommodated in the shell,
wherein, when the external device is inserted into the first interface, the action assembly is configured to shut off an electrical connection between the vaporization component and the battery assembly,
wherein the action assembly comprises a mechanical movable member, and
wherein, when the external device is inserted into the first interface, the external device is configured to push the mechanical movable member to move from a first position to a second position, and the mechanical movable member is configured to push the vaporization component to move simultaneously to shut off the electrical connection between the vaporization component and the battery assembly,
wherein the mechanical movable member is arranged on the holder and is slidably connected to the holder,
wherein the mechanical movable member comprises a first push rod, a second push rod, and a connection rod,
wherein the first push rod and the second push rod are spaced, the first push rod and the second push rod are both slidably connected to the holder, end portions of the first push rod and the second push rod that are away from the first interface abut the vaporization component, and end portions of the first push rod and the second push rod that are close to the first interface are connected through the connection rod, and
wherein, when the external device is inserted into the first interface, the external device is configured to push the connection rod to cause the mechanical movable member to move from the first position to the second position.

* * * * *